United States Patent
Warren et al.

(10) Patent No.: US 8,526,671 B2
(45) Date of Patent: Sep. 3, 2013

(54) THREAT DETECTION SENSOR

(75) Inventors: Michael Warren, Clermont, FL (US); Max Amon, Apopka, FL (US); Robert F. Sandh, Jr., Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1550 days.

(21) Appl. No.: 12/073,679

(22) Filed: Mar. 7, 2008

(65) Prior Publication Data

US 2009/0226109 A1 Sep. 10, 2009

(51) Int. Cl.
- G06K 9/00 (2006.01)
- G06K 9/46 (2006.01)
- G06K 9/66 (2006.01)
- G01C 3/08 (2006.01)
- G01J 3/30 (2006.01)
- G01J 1/42 (2006.01)
- H01L 25/00 (2006.01)

(52) U.S. Cl.
USPC .......... 382/103; 382/191; 356/4.01; 356/315; 250/372; 250/332

(58) Field of Classification Search
USPC ............... 382/103, 191; 356/315, 4.01, 4.07; 250/372, 332
See application file for complete search history.

(56) References Cited

U.S. PATENT DOCUMENTS

| | | | | |
|---|---|---|---|---|
| 3,609,364 | A * | 9/1971 | Paine et al. | 250/372 |
| 5,072,120 | A * | 12/1991 | Siewick | 250/330 |
| 5,534,697 | A * | 7/1996 | Creekmore et al. | 250/332 |
| 5,677,761 | A * | 10/1997 | Hasson | 356/4.07 |
| 6,373,558 | B1 * | 4/2002 | Hasson | 356/4.07 |
| 6,621,764 | B1 * | 9/2003 | Smith | 367/128 |
| 2007/0017281 | A1 * | 1/2007 | Rodgers et al. | 73/116 |
| 2007/0125951 | A1 * | 6/2007 | Snider et al. | 250/363.03 |
| 2008/0191926 | A1 * | 8/2008 | Benayahu et al. | 342/52 |
| 2008/0208514 | A1 * | 8/2008 | Weber et al. | 702/134 |

* cited by examiner

*Primary Examiner* — Bernard Krasnic
(74) *Attorney, Agent, or Firm* — Birch, Stewart, Kolasch & Birch, LLP

(57) ABSTRACT

The systems and methods disclosed herein address issues of cost and weight that prevent other threat detection systems intended to detect and identify locations of incoming munitions fire such as RPGs, anti-tank missiles, and other such weapons, from being used more broadly. Systems and methods disclosed herein relate, in part, to a portable, optical sensor that has a 360-degree horizontal field of view and a selectable vertical field of view that can cover up to 90 degrees. Variations of systems and methods discussed herein are meant for use and transport by an individual or group of individuals, and do not require significant support electronics or power supplies in excess of a typical car-battery in size and weight. Other embodiments may be vehicle mounted, or may be further enhanced to work with other detection or response systems.

14 Claims, 4 Drawing Sheets

THREAT DETECTION SENSOR

BACKGROUND OF THE INVENTION

1. Field of the Invention

The present invention relates generally to the detection of incoming munitions fire and, more particularly, to methods and devices for detecting incoming fuel-burning munitions such as rockets and missiles.

2. Description of Related Art

Detection of incoming threats is a goal of ever-increasing importance in any battlefield situation. The ability to detect, prepare for, and take measures against incoming weapons fire is a critical ability for any military forces in a hostile environment.

Threat detection technologies have generally evolved as weapons have become progressively more powerful, more portable, and more readily concealable. Given the ability of military or paramilitary forces, or even civilians, to acquire and use weapons such as Stinger missiles, rocket-propelled grenades (RPGs), or M72 anti-tank rockets, the need for rapid detection of the use of such weapons becomes an ever-more essential defensive capability for deployed soldiers.

Current systems capable of detecting firing of such portable, shoulder-fired weapons are costly and complex. Systems are available that employ RADAR, infrared, and ultraviolet spectral ranges for detection. These systems typically require multiple sensors and complex mechanical or electrical steering systems to accomplish 360-degree coverage and accurate detection. Further, the need for a system to be steered means that it cannot simultaneously provide detection in all directions, limiting its field of vision and response time. Limited response time, while perhaps only amounting to fractions of a second, is a serious drawback when the detected threats are traveling towards a target at hundreds of miles per hour.

The cost and weight of such systems also pose difficulties to their production and field use. Multiple sensors and steering mechanisms render these systems expensive and heavy, meaning that production of them may be limited, and that they are most likely to be deployed onto large vehicles such as tanks and aircraft, or affixed to permanent structures such as buildings or antenna towers.

A system capable of providing incoming threat detection that is lightweight and low-cost would be suitable for use by small units of troops, affording them enhanced defensive capability and allowing them to respond more effectively to attacks. Such a system may also suitable for non-military applications that require the detection of approaching objects or animals.

BRIEF SUMMARY OF THE INVENTION

The present invention seeks to address the issues of cost and weight normally associated with threat detection systems intended to detect and identify locations of incoming munitions fire such as RPGs, anti-tank missiles, and other such weapons.

The invention consists of a portable, optical sensor that has a 360-degree horizontal field of view and a vertical field of view selectable by design between 0 and 90 degrees. The sensor is meant to be carried and fielded by an individual or group of individuals, and does not require significant support electronics or power supplies in excess of a typical car-battery in size and weight.

A cylindrical window allows the sensor a 360-degree field of view, giving panoramic line-of-sight coverage without requiring any mechanical or electrical steering mechanism. Refractive optics consolidate the incoming light and direct it to a filtering device configured to remove all but a certain wavelength of light. This wavelength is known to correspond to light produced by the burning of substances such as potassium and other elements and compounds typically found in the propellants of rocket-propelled munitions.

In one embodiment of the present invention, a reflector mounted to the top of the cylindrical window governs the vertical field of view (FOV) of the sensor, determining how far above and below the horizon the device can "see." This enables the device to ignore devices such as flares, passing jets, and other possible sources of high-altitude interference without compromising the effectiveness or sensitivity of the detector. This is accomplished by ensuring that the window and reflector are shaped such that light may not pass through the refractive optics portion of the sensor without first entering the cylindrical window and reflecting off the reflector. This allows for control over the vertical field of view by changing the shape of the reflector.

One embodiment of the present invention employs a reflector that is an optical element with an optical power. Alternative embodiments may employ plane cones, tunable optical elements, or other reflective components that may or may not be adjustable for field-of-view considerations depending on the specific application intended.

An embodiment of the invention may be equipped with a Magneto-Optical filter designed to reject all light impinging on it except for the narrow wavelengths corresponding to potassium, which is a widely used component in rocket propellants. This allows for the identification of small rocket launches without requiring hardware components to track movement or image a scene in a spectrum such as infrared or ultra-violet.

An embodiment of the invention may be further equipped with an image intensifier tube that performs optical gain and wavelength shift functions. This allows for the conversion of the filtered light signal into a light signal sufficiently intense that it can be detected by conventional optical detectors such as a charge-coupled device (CCD), complementary metal-oxide-semiconductor (CMOS) device, a PIN photodiode, or other electro-optic sensor.

Embodiments of the present invention may be configured so that even after filtering and intensification, the remaining light signal retains a frame of reference to the scene as originally imaged. This enables the sensor to determine the location of the detected rocket launch within the imaged scene.

Yet further embodiments of the present invention may be configured to track a rocket or RPG launch after detection, allowing for the determination of a trajectory and the activation of an appropriate signaling device should the detected trajectory of the munition be deemed likely to result in an impact at or near the sensor. Such embodiments may be further configured to have an adjustable threat radius or a munition identification sub-unit so that depending on the configured threat radius or the detected munition type, an appropriate alert can be issued depending on the expected proximity of the impact site of the munition with respect to the sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Current sensor systems available for threat detection are typically in the form of mechanically or electrically scanned radar or cryogenically cooled detectors. The present invention has the advantages of requiring no mechanical or electrical scanning, or any form of cryogenic cooling. This reduces both weight and component cost as the need for mechanical actuators, complex electronics, and cooling/refrigeration systems is reduced.

Although a forward-looking detection device can be rotated for 360 degree imaging or utilize multiple sensors to cover 360 degrees these configurations introduce a host of complexities readily avoided by looking in all directions at once. A device that has a 360-degree range of light intake does not need to be rotated or use multiple sensors.

Figure 1:
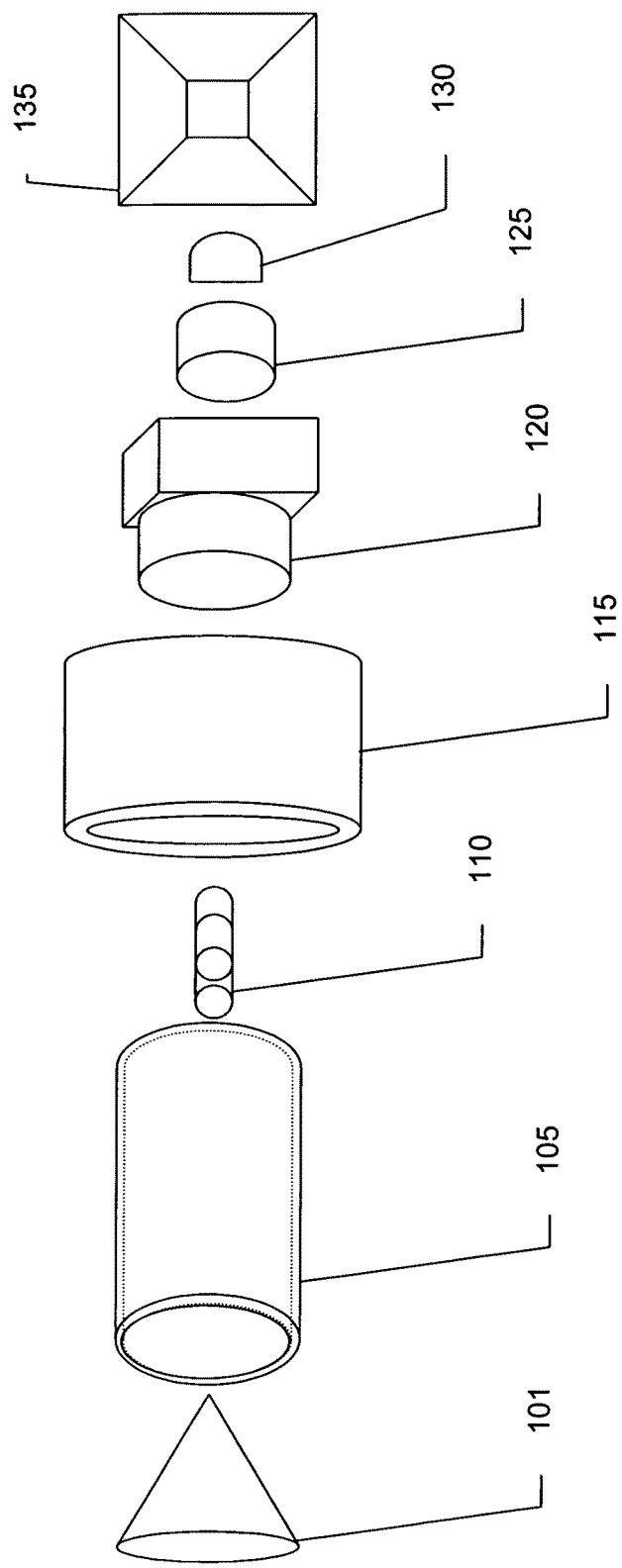
FIG. 1 shows an exploded view of the components in the inventive detector device.

FIG. 1 is an illustration of an embodiment of a device consistent with the present invention, where the device is capable of accepting an incoming light signal in a 360-degree horizontal plane. Light enters through a cylindrical window 105 and is directed, with the help of an optical element reflector 101 into a set of refractive optics 110 contained in a housing 115. The light is next passed through a magneto-optical filter (MOF) 120 that is used to filter out all light wavelengths except 770 nanometers ±50 milli-angstroms, which is usually associated with the burning of potassium—a known common component in man-portable anti-aircraft and anti-tank missile weapons. The present invention employs a potassium MOF to take advantage of a low solar intensity level at the potassium wavelength, facilitating the suppression of background clutter during daylight hours.

The filtered light is next passed through an image intensifier 125 that performs optical gain and wavelength shift functions to intensify the remaining light signal and render it back into a more readily visible spectrum. After intensification, the light signal passes through a relay lens 130 and is detected by a silicon sensor array such as a CCD or CMOS device 135. The array may then be connected to a variety of devices to signal the detection of self-propelled munitions launch.

Other embodiments of the detector may filter different wavelengths, such as those associated with burning hydrogen or with sodium, for example, in order to detect launches of liquid-fueled rockets, or objects that may be treated with radar-masking paints. Yet other embodiments of the detector may employ a filter other than a magneto-optical filter, relying instead on polarizing filters or other forms of wavelength-specific filters. Yet further embodiments may employ filter configurations that eliminate the image intensifier and just image the output of the filter on the focal plane array depending upon target rocket plume radiance and spectra. Still other embodiments of the invention may alter the shape of the MOF bandpass. Any conceivable MOF could be employed in an embodiment of the invention.

Further embodiments of the present invention may employ filters that remove all visible light wavelengths, instead focusing purely on passive detection of infrared, millimeter-wave, ultra-violet, or even x-ray radiation. Such a detection device is capable of detecting any electromagnetic energy wavelength that can pass through a cylindrical window designed to allow such radiation in, and be reflected down into a filtering device by a reflector designed to reflect such radiation. A visually transparent window and a visually reflective reflector are only disclosed as examples of this broader concept. Other embodiments may employ "windows" made of porous ceramic and "reflectors" made of dense metal for the purpose of admitting and reflecting millimeter wave radiation.

Other embodiments of the present invention may use different filtering techniques, such as intermittent filtering. This will enable the capture of both filtered and non-filtered images, allowing for later comparisons between the images for things like target identification or enhanced target identification. Such a system may also be synchronized with an active signal source for comparing and contrasting images.

Still other embodiments of the detector shown in FIG. 1 may employ a different image intensification device or different image intensification techniques. Alternatives may include no wavelength shift, or a complete conversion from an optical to an electrical signal, negating the need for an optical detector such as a CCD. Still other embodiments may convert incoming invisible radiation into visible radiation to facilitate the visual detection of infrared, ultra-violet, or other types of electromagnetic radiation. Other embodiments of the invention may also employ alternative image intensification techniques, such as intermittent image intensification where only every other image captured is intensified. This may allow for the identification and selection of objects of interest that can then be projected back onto an un-intensified image. Yet other embodiments may dispense with image intensification entirely.

The optical detector, in other embodiments, may comprise a PIN photodiode, a focal plane array, a phototransistor, a photovoltaic cell, or even a photographic plate. The term "focal plane array" can refer to an array of photo-detectors of any spectral sensitivity such as visible, near infra-red, short wave infra-red, mid-wave infra-red, long wave infra-red, or ultraviolet. Alternative embodiments of the invention need not limit the detector to any one band or size.

Figure 2:
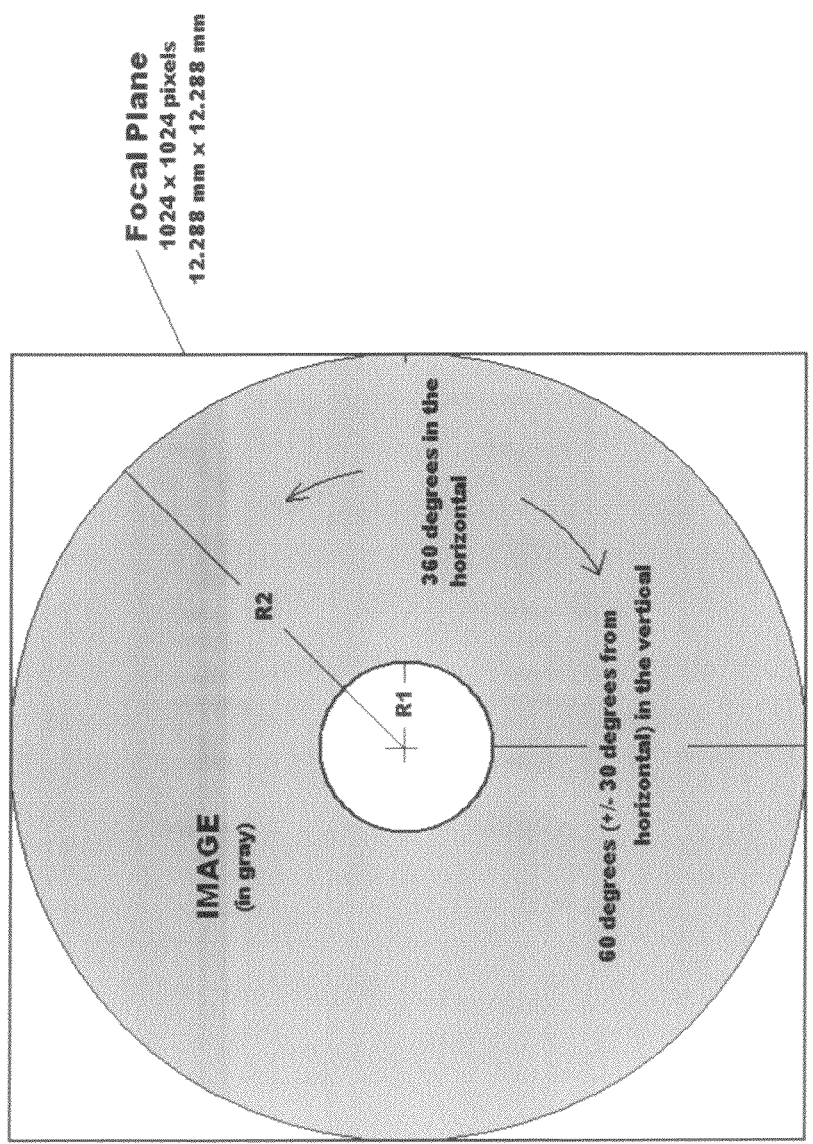
FIG. 2 shows an example of an image on the focal of a sensing device such as a CCD or CMOS imaging detector.

FIG. 2 shows the imaging plane of a 1024×1024 focal plane array device. The white area represents non-imaged pixels—ones that are not expected to receive incoming light signal. The central non-imaging area has a radius RI that is determined by the vertical field of view. In this example, the field of view is 60 degrees (30 degrees up, 30 degrees down). The width of the active area (shown in gray) of the focal plane array is determined by the difference between radius R1 and radius R2. The location of a detected munitions launch is determined by three factors. The planar position of a set of detection pixels within the active area determines where in the horizontal field of view the detected munitions launch took place. The distance of the pixel(s) from the center of the imaging plane determines where in the vertical field of view the detected munitions launch took place, with the outer edge representing the top of the vertical field of view, and the inner edge representing the bottom. The intensity of the image signal, plus its size, aids in determining the type or proximity of the launch.

Upon detection, a launch may be tracked. If it maintains its horizontal position over time, then the munition is determined to be heading directly towards (or away from) the detector. A detected launch that changes its horizontal position may also be tracked to determine if the amount of horizontal deflection detected will result in the munitions landing more than certain distance away (horizontally) from the detector. Any munition determined to land outside of a predetermined radius about the detector may be deemed harmless.

If the intensity of the detection increases, the munition may be determined to be approaching the detector. If the intensity of the detection decreases, the munition may be determined to be moving away from the detector. Also, initial detection intensity may aid in determining the direction of a fired munition. A detected launch of certain brightness may indicate that the rocket engine is facing the detector, which would suggest that the munition is moving away from the detector.

If the vertical position does not change over time, the munition is determined to be on a level flight-path. A tracked munition with a vertical position that first increases and then decreases may be determined to be on a ballistic flight path. Because most self-propelled munitions are generally not ballistically fired, the presence of a ballistic trajectory may help in identifying the detected object or in dismissing it as a potential threat.

Other embodiments may employ different detection and tracking paradigms. A PIN diode-based detector may only detect a munition launch without concern for tracking a horizontal or vertical position. Yet other embodiments may employ different pixel resolutions, and may have wider or narrower fields of view in the horizontal.

Figure 3:
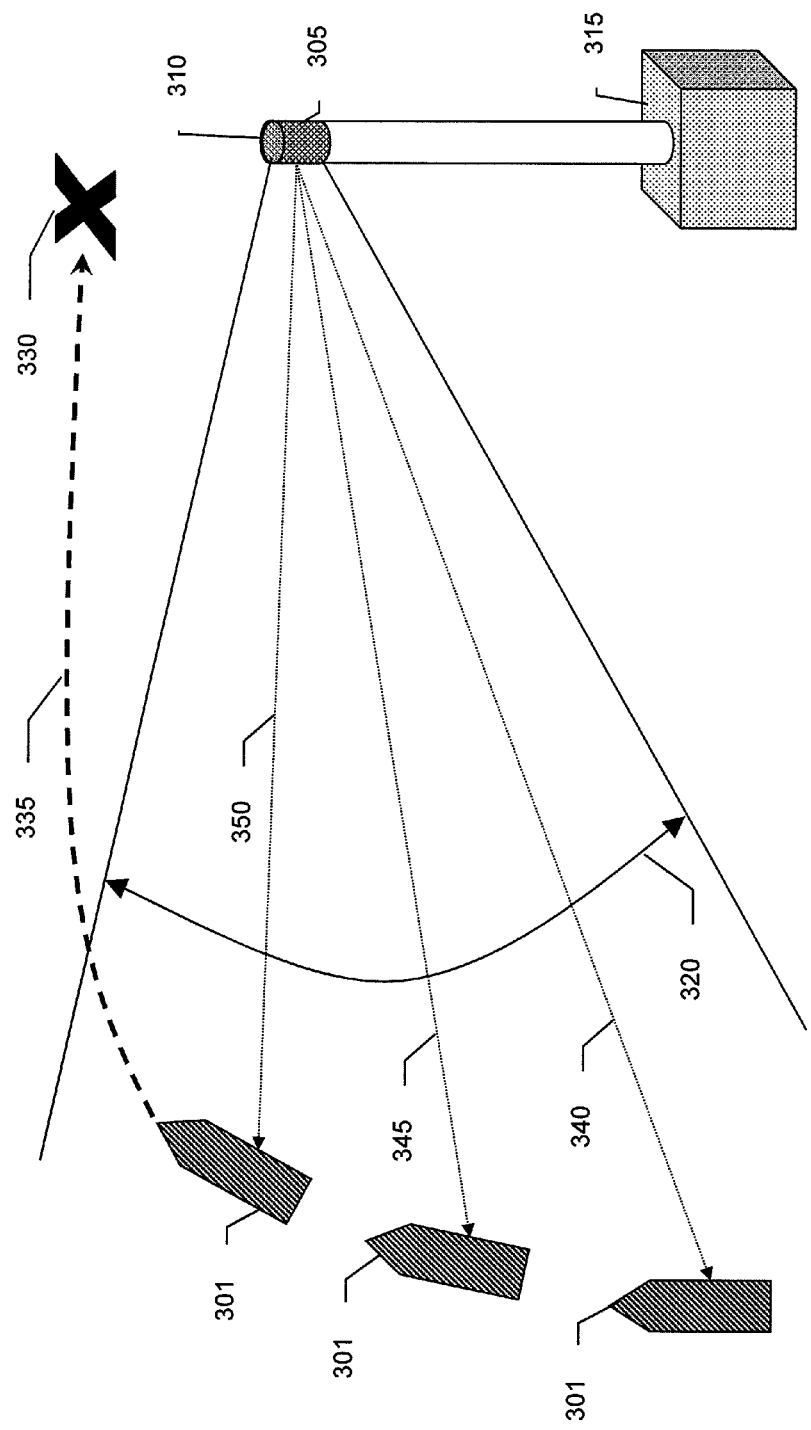
FIG. 3 shows an exemplary detection and tracking embodiment.

FIG. 3 shows an embodiment of an optical detection and tracking system according to the present invention. The inventive device comprises a detector unit 305 and control electronics 315. The optical design including the reflective element 310 determines the field of view 320. After a munition 301 launch is detected 340, the detector continues to track the munition's flight path 345, 350. This tracking information allows the detector to extrapolate a trajectory 335 and a predicted impact point 330. The relative proximity of the expected impact point to the detector may then trigger an alarm.

The image detected by the detector 305 can be converted to a rectilinear panoramic display. In certain embodiments, there is no background image, so the display would resemble an old radar screen, showing only "blips" of detection. In other embodiments, the system may acquire alternating filtered and un-filtered images, enabling the display of a weapons discharge detection superimposed on a background scene. Yet other embodiments of the device are intended for autonomous operation, providing only an alert signal when a weapons discharge is detected and determined to pose a threat.

Figure 4:
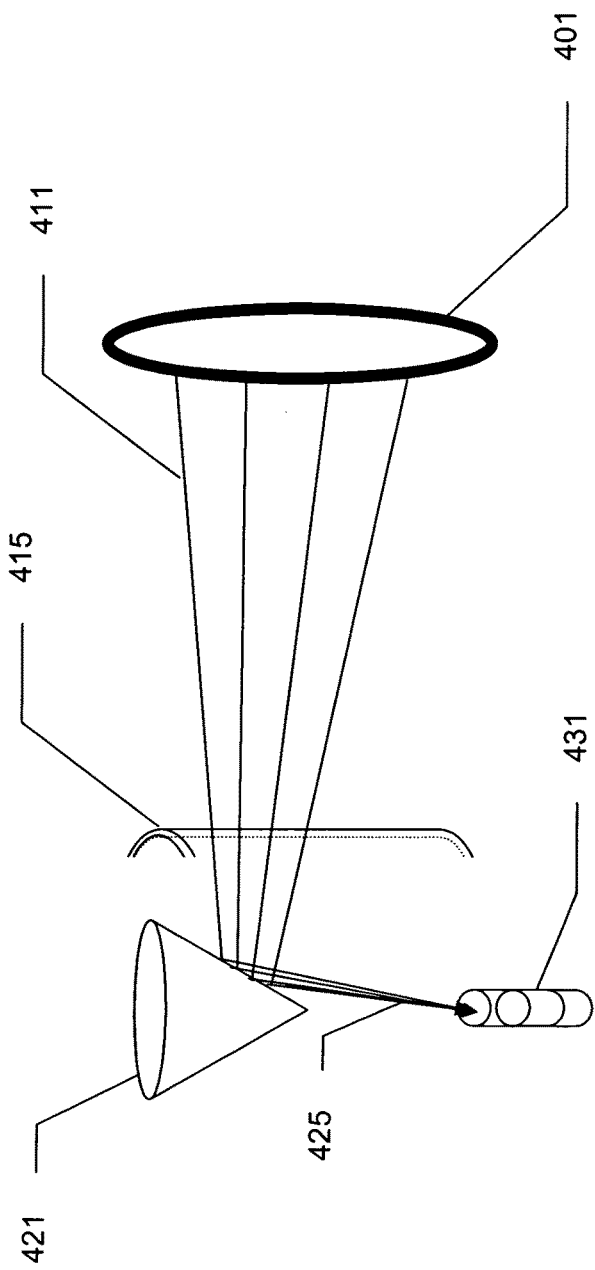
FIG. 4 shows an example of how an embodiment of a reflector functions.

FIG. 4 shows the operation of an embodiment of a reflector in an embodiment of the present invention. In this embodiment, incident light 411 from the environment 401 passes through a window 415 of the detector and is redirected by the reflector 421. In this embodiment, the reflector 421 is an optics element with an optical power. This allows for the redirected light 425 to be concentrated and focused into the refractive optics 431. This type of reflector can be designed with a specific vertical field of view, such as 45 degrees, 60 degrees, or 90 degrees. Incident light outside the field of view determined by the reflector will not be redirected by the reflector 421.

Other embodiments of the present invention may contain reflectors that are plane cone elements, refractive prisms, or composite devices that incorporate elements such as adjustable apertures and image intensification technology, allowing for variable field of view or non-visible radiation detection and redirection. Yet other embodiments of the invention may dispense with a reflector entirely, instead employing an element analogous to a 'fisheye' lens, providing 360×180 degree field of view coverage.

Only exemplary embodiments of the present invention are shown and described in the present disclosure. It is to be understood that the present invention is capable of use in various other combinations and environments and is capable of changes or modifications within the scope of the inventive concept as expressed herein. Such variations are not to be regarded as departure from the spirit and scope of the invention, and all such modifications as would be obvious to one skilled in the art are intended to be included within the scope of the following claims:

The invention claimed is:

1. A sensor for detecting a firing of a munition towards said sensor from any line-of-sight location with a 360-degree circle surrounding said sensor; the sensor comprising:
   a cylindrical window, said cylindrical window having a 360-degree horizontal field of view to receive an electro-optical signal in a 360degree radius;
   refractive optics to capture and condense the received electro-optical signal, at least part of said refractive optics being disposed within an inner wall of a cylinder defined by said cylindrical window, said refractive optics including
      a reflector device to redirect the received electro-optical signal; and
      a series of refracting and focusing elements;
   a filter unit to remove all but a wavelength range generated by combustion of a chemical contained in a munition propellant from said condensed electro-optical signal;
   a relay device to transmit the filtered electro-optical signal to an image sensor;
   an image sensor to detect said relayed electro-optical signal and transmit corresponding detection data to subsequent alarm, display, targeting, or processing devices; and
   a reflector deforming device that allows the reflector to be made longer or shorter and wider or narrower, thereby adjusting a vertical field of view of said sensor.

2. The sensor of claim 1, said filter unit comprising a magneto-optical filter.

3. The sensor of claim 1, the relay device comprising an image intensifier that intensifies the filtered electro-optical signal.

4. The sensor of claim 3, said image intensifier comprising a photomultiplier device.

5. The sensor of claim 1, said image sensor comprising:
   a silicon focal plane array; and
   a detection verification device to determine if a signal detected by the focal plane array is a valid munitions launch detection, wherein a valid launch detection is one determined to have a likelihood of impact within a certain distance of the sensor.

6. The sensor of claim 5, further comprising an alarm device that is triggered by a valid munitions launch detection.

7. The sensor of claim 1, said reflector device comprising an optical component with an optical power.

8. The sensor of claim 1, said reflector being disposed at a top of said cylindrical window;
   said reflector being disposed above said refracting and focusing elements; and
   said reflector and said cylindrical window being shaped relative to each other such that light cannot pass through said refracting and focusing optical elements by entering said cylindrical window unless said light is first redirected into said optics by said reflector after passing through said cylindrical window.

9. The sensor of claim 1, said wavelength range comprising a wavelength of 770 nanometers ±50 milli-angstroms.

10. The sensor of claim 1, said cylindrical window having no refractive effect on incoming electro-optical within a field of view of said sensor.

11. The sensor of claim 1, said reflector device comprising a component that re-directs non-visible electro-optical radiation into said focusing elements.

12. The sensor of claim 1, said cylindrical window being opaque to visible light but transparent to at least one non-visible wavelength of electro-optical radiation.

13. The sensor of claim 1, said cylindrical window being oriented approximately perpendicular to the horizon.

14. The sensor of claim 1, wherein said cylindrical window is transparent to at least one wavelength of visible light.

* * * * *